(12) United States Patent
McQueen

(10) Patent No.: US 8,121,261 B2
(45) Date of Patent: Feb. 21, 2012

(54) SYSTEMS AND METHODS FOR PROVIDING INTERPRETATION SERVICES

(75) Inventor: Kevin V. McQueen, Kennesaw, GA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1602 days.

(21) Appl. No.: 11/209,615

(22) Filed: Aug. 24, 2005

(65) Prior Publication Data

US 2007/0050306 A1    Mar. 1, 2007

(51) Int. Cl.
*H04M 1/64* (2006.01)
*H04M 15/00* (2006.01)

(52) U.S. Cl. ............ 379/88.06; 379/114.05; 379/114.15
(58) Field of Classification Search ................ 379/88.18
See application file for complete search history.

(56) References Cited

U.S. PATENT DOCUMENTS

| | | | |
|---|---|---|---|
| 4,868,782 A * | 9/1989 | Lawrence et al. ............. 709/217 |
| 5,041,994 A * | 8/1991 | Lahey et al. .................. 358/1.11 |
| 5,353,335 A * | 10/1994 | D'Urso et al. ............. 379/114.2 |
| 5,392,343 A * | 2/1995 | Davitt et al. ............. 379/265.12 |
| 5,875,422 A * | 2/1999 | Eslambolchi et al. ............ 704/3 |
| 6,038,292 A * | 3/2000 | Thomas ..................... 379/88.06 |
| 6,385,586 B1 * | 5/2002 | Dietz ............................. 704/277 |
| 6,532,016 B1 * | 3/2003 | Venkateswar et al. ........ 345/504 |
| 6,535,215 B1 * | 3/2003 | DeWitt et al. ................. 345/473 |
| 6,570,963 B1 * | 5/2003 | Watson et al. ................... 379/52 |
| 6,820,055 B2 * | 11/2004 | Saindon et al. ............... 704/235 |
| 6,990,670 B1 * | 1/2006 | Hodjat ........................... 719/317 |
| 7,089,582 B1 * | 8/2006 | Dutta ................................ 726/3 |
| 7,362,256 B1 * | 4/2008 | Provis et al. ................... 341/173 |
| 7,376,415 B2 * | 5/2008 | Surette .......................... 455/418 |
| 7,395,200 B2 * | 7/2008 | Roston .............................. 704/3 |
| 7,593,523 B2 * | 9/2009 | Sterns ...................... 379/265.12 |
| 7,761,591 B2 * | 7/2010 | Graham ......................... 709/233 |
| 7,792,276 B2 * | 9/2010 | Moore et al. ............. 379/265.12 |
| 7,894,596 B2 * | 2/2011 | Moore et al. ............. 379/265.12 |
| 7,979,265 B2 * | 7/2011 | Suzuki et al. ..................... 704/4 |
| 8,023,626 B2 * | 9/2011 | Moore et al. ............... 379/90.01 |
| 2004/0014462 A1 * | 1/2004 | Surette .......................... 455/418 |
| 2005/0034079 A1 * | 2/2005 | Gunasekar et al. ........... 715/753 |
| 2005/0084078 A1 * | 4/2005 | Miller et al. ............... 379/88.06 |
| 2005/0251421 A1 * | 11/2005 | Chang et al. ..................... 705/2 |

OTHER PUBLICATIONS

Language Line Services; www.languageline.com; Aug. 3, 2005 (print date); 1 page.
ICN Staff, "Easy Speak: Interpreter Card Breaks Down Language Barriers", Intele-Card News, Oct. 5, 2005, http://www.intelecard.com/features/03features.asp?A_ID=556.

* cited by examiner

*Primary Examiner* — Joseph T Phan

(57) ABSTRACT

A communications platform provides communication services for parties communicating in different languages. The communications platform may receive a language interpretation request from a first party via a telephone device and identify first and second languages associated with the request. The communications platform may determine whether the first party is associated with an account, to which a fee associated with the language interpretation is to be debited, and may forward the language interpretation request based on the association of the first party with the account.

26 Claims, 11 Drawing Sheets

300

SYSTEMS AND METHODS FOR PROVIDING INTERPRETATION SERVICES

FIELD OF THE INVENTION

The present invention relates generally to providing communication services and, more particularly, to providing language interpretation services.

BACKGROUND

Interpreters can be used to interpret telephone conversations of parties speaking different languages. A multi-way calling feature may be used to connect an interpreter to a telephone call. For fee-based interpretation services, the interpreter typically must be lined-up for the call ahead of time and the details for billing the interpretation services pre-arranged. In requesting the services of an interpreter, one of the parties to the conversation specifies the languages to be interpreted, the time the interpreter will be needed, the steps for connecting the interpreter to the call, and the like. However, situations arise where it is not convenient to pre-arrange the interpretation services. For example, it may not be known ahead of time at what point or for how long an interpreter will be needed during the course a call.

SUMMARY OF THE INVENTION

According to one aspect of the invention, a method of providing communication services is provided. The method may include receiving a language interpretation request from a first party via a telephone device. The method may also include identifying first and second languages associated with the language interpretation request. The method may also include determining whether the first party is associated with an account, to which a fee associated with the language interpretation is to be debited. In addition, the method may include forwarding the language interpretation request based on the association of the first party with the account.

According to another aspect of the invention, a system including an interpretation platform is provided. The interpretation platform may be configured to receive a language interpretation request from a first party. The interpretation platform may also be configured to determine whether the first party is associated with an account. The interpretation platform may also be configured to determine, when the first party is associated with the account, whether sufficient finds are in the account for the language interpretation request. In addition, the interpretation platform may also be configured to enable a multi-party communication among the first party, the second party, and an interpreter, when the account has sufficient funds.

According to yet another aspect of the invention, an interpretation platform is provided. The interpretation platform may an interpretation platform configured to receive a language interpretation request from a first party. The interpretation platform may also be configured to determine whether the first party is associated with an account. The interpretation platform may also be configured to determine, when the first party is determined to be associated with the account, whether sufficient funds are in the account for the language interpretation request. In addition, the interpretation platform may be configured to enable a multi-party communication among the first party, a second party, and an interpreter, when the account has the sufficient funds.

According to yet another aspect of the invention, a method of providing interpretation services for a multi-language communication via a multi-party communication link that is established using an account is provided. The method may include means for receiving a request for interpretation services. The method may also include means for verifying an account to which a fee associated with the interpretation services is to be debited. In addition, the method may include means for enabling the interpretation services via a multi-party communication link based on the verification.

According to yet another aspect of the invention, a method of providing interpretation services for a multi-language communication via a multi-party communication link that is established using a subscriber account is provided. The method may include receiving a request for the interpretation services from an input from a party to the multi-party communication link, the input including at least one of a function key selection, a call placed to an access number, or a response to a prompt from an interactive voice response (IVR) unit. The method may also include identifying the languages of the multi-language communication from at least one of an origination associated with the request, the access number, or a response to a further prompt from the IVR unit. The method may also include forwarding the request to an interpreter based on the identified languages. The method may also include connecting the interpreter to the multi-party communication link. The method may also include determining a fee associated with the interpretation services. In addition, the method may also include assessing the fee to the subscriber account.

BRIEF DESCRIPTION OF THE DRAWINGS

The accompanying drawings, which are incorporated in and constitute a part of this specification, illustrate an implementation consistent with the principles of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Overview

Implementations consistent with the principles of the invention provide a communications platform (e.g., an interpretation platform) for a multi-party, multi-language telecommunication. In one exemplary implementation, an interpretation platform is configured to receive a language interpretation request from a first party. Upon receiving the language interpretation request, it may be determined whether the first party is associated with an account. Where the first party is determined to be associated with the account, it may be determined whether sufficient funds are in the account for the language interpretation request. In this way, a multi-party communication may be enabled among the first party, a second party, and an interpreter, when the account has sufficient funds.

An "account," as the term is used herein, is to be broadly interpreted to include any business relationship established to provide, for example, financial transactions. An account may include, for example, a prepaid or debit account which may be associated with a subscriber and may be funded to a prepaid credit (i.e., a positive balance). That is, a prepaid account may be associated with a payment received for communication services before the services are actually used. Other types of accounts may be used consistent with the principles of the invention. The account may be established for any duration and by any suitable arrangement. The account may include using any suitable accounting units, for example, monetary, time, and/or other defined units or a combination thereof. "Assessing," "debiting," "deducting," and "decrementing," as the terms are used herein in the context of an account, are to be broadly interpreted to include any debit-side accounting of transactions associated with an account.

Exemplary System

Figure 1:
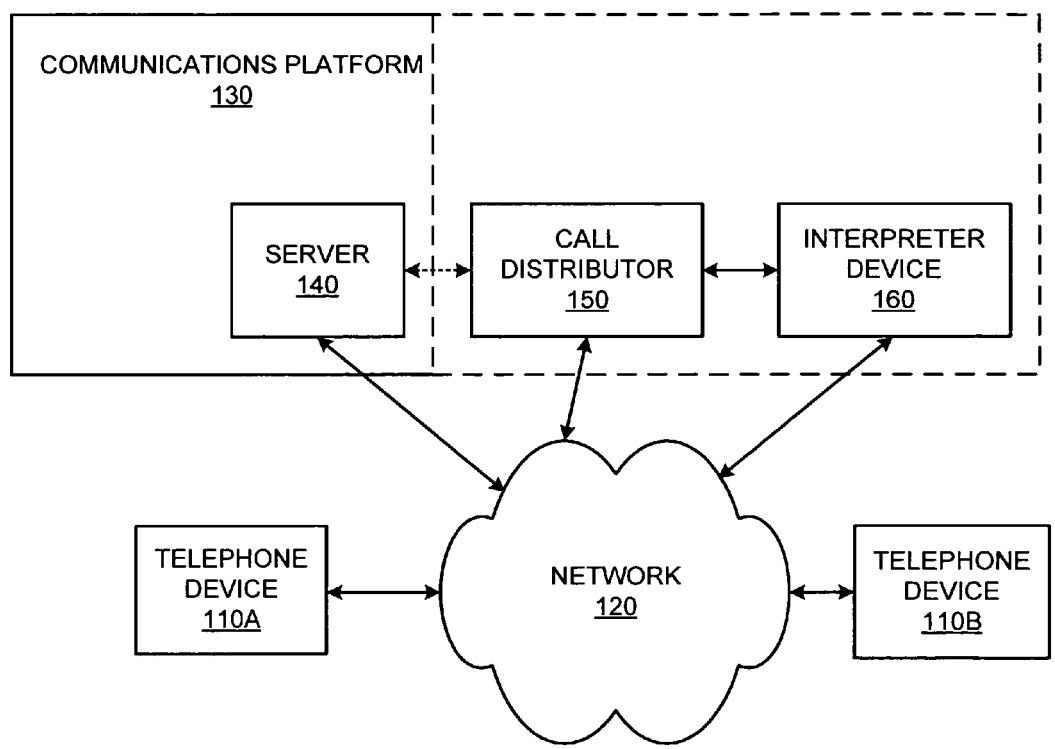
FIG. 1 is a diagram of an exemplary system in which methods and systems consistent with the present invention may be implemented.

FIG. 1 is a block diagram of an exemplary system 100 in which methods and systems consistent with the principles of the present invention may be implemented. System 100 may include telephone devices 110A and 110B (referred collectively as telephone devices 110) and a communications platform 130 that connect via a network 120. The exemplary configuration illustrated in FIG. 1 is provided for simplicity. It is to be appreciated that a typical system could include more or fewer telephone devices 110 and communications platforms 130 than illustrated in FIG. 1.

Furthermore, various links shown as connecting the elements may be wired or wireless links or any combination thereof, or any other known or later developed element(s) that is capable of supplying and/or communicating data to and from the connected elements. Additionally, it should be appreciated that while various functional components are illustrated, various other components may also be included. For example, a conference bridge device/platform (not shown) configured to link two or more parties via a conference call and the associated analog and/or digital telephony, circuits, gateways, databases, switching devices, routers, firewalls, software, security components, etc., for supporting the conference call may be included in system 100. These and other devices may enable communications involving at least a first and second party, and an interpreter(s).

Telephone devices 110 may include any telephony device that may interface with a network, such as network 120, to place and receive telephone calls. Telephone devices 110 may include a plain old telephone system (POTS) phone, a cordless telephone, a cellular telephone, or any other type of telephony interface. Telephone devices 110 may also include any type of device that is capable of transmitting and receiving voice signals to/from a data network. For example, telephone devices 110 may include, for example, a computer device, a web-based appliance, etc., that is configured to provide telephone functions. Telephone devices 110 may include, for example, a session initiation protocol (SIP)-based telephone device or another voice over Internet protocol (VoIP)-based telephone device, a personal digital assistant (PDA), or any other multi-function device with telephony capabilities.

Network 120 may include a public switched telephone network (PSTN), a private branch exchange (PBX), the Internet, an intranet, a LAN, a WAN, and/or another type of network that is capable of transmitting voice signals from a source device to a destination device. Network 120 may further include one or more wireless networks and may include a number of transmission towers, base stations, etc., for receiving wireless signals and forwarding the wireless signals toward the intended destination.

Communications platform 130 may include any number of software or hardware-controlled devices or various other components that may be cooperatively configured to provide an interpretation platform consistent with the principles of the present invention, as described in more detail below. For example, as illustrated in FIG. 1, communications platform 130 may include a server 140, a call distributor 150 and an interpreter device 160. It will be appreciated that communications platform 130 may include other devices, such as a speech synthesizer, a voice response system, an interactive voice response (IVR) unit, a conference bridge device/platform, and the like (not shown) that facilitate communications in system 100.

Server 140 may include a computer device that may manage resources of communications platform 130 and enable a connection of telephone devices 110 with interpreter device 160. For example, server 140 may include a call validation server, a billing server, a prepaid call server, and the like. Details regarding the specific functionality of server 140 are set forth in additional detail below.

Call distributor 150 may include any call distribution mechanism that may receive telephone calls via server 140 and manage the received telephone calls according to handling instructions including, for example, an automatic call distributor (ACD). For example, call distributor 150 may forward a call to interpreter device 160.

Interpreter device 160 may include a workstation or a computer, such as a personal computer or laptop, through which an interpreter may provide interpretation services. The interpretation services may include, for example, interpreting all or a portion of a telephone conversation. In one implementation, interpreter device 160 may be associated with a call center operated by a vendor of interpretation services, for example, that may be coupled to communications platform 130 via network 120. In another implementation, interpreter device 160 may, as illustrated in FIG. 1, be associated with communications platform 130.

In an exemplary implementation consistent with the invention, interpreter device 160 may include a speech recognizer that performs speech recognition. The speech recognizer may include software and/or hardware configured to convert received voice data into text output. Interpreter device 160 may also include a language translator configured to translate the text from a first language into one or more other languages. Interpreter device 160 may also include a high speed text input device, such as a stenographic device, a communication access real-time translation (CART) device, etc. Interpreter device 160 may also include a text-to-speech (TTS) synthesizer that may perform speech synthesis. The TTS synthesizer may be configured to convert text data into spoken voice output. Accordingly, interpreter device 160 may use any combination of interpreter and automated operations in providing all or any portion of the interpretation/translation services in systems and methods consistent with the principles of the invention.

Interpreter device 160 may also include a telephone device that allows the interpreter to place and receive telephone calls. For example, the telephone device may include a standard telephone, a cordless telephone, a cellular telephone or any other type of telephone. The telephone device may also include any type of device that is capable of transmitting and receiving voice signals to/from a data network. For example, the telephone device may include any client, such as a computer device, a web-based appliance, etc., that is configured to provide telephone functions. The telephone device may include, for example, a SIP-based telephone device or a PDA. In this case, the SIP-based telephone device may take the form of a standalone device, e.g., a SIP telephone designed and configured to function and appear like a conventional telephone. A SIP-based telephone device may also include a software client that may run, for example, on a conventional PC, laptop computer, or other computing device.

In an exemplary implementation consistent with the invention, server 140, call distributor 150, and interpreter device 160 may enable a first party communicating in a first language to communicate with a second party communicating in a second language via communications platform 130. Server 140 and interpreter device 160 are illustrated in FIG. 1 as being connected via call distributor 150 and network 120. In alternative implementations, server 140, call distributor 150, and interpreter device 160 may be connected directly to each other, connected via a LAN, connected via a private network, etc. In still other implementations, the functions performed by server 140 and call distributor 150, described in more detail below, may be performed by a single device/platform. In still further alternative implementations, the functions performed by server 140, call distributor 150 and interpreter device 160 may be performed by a single device/platform.

Figure 2:
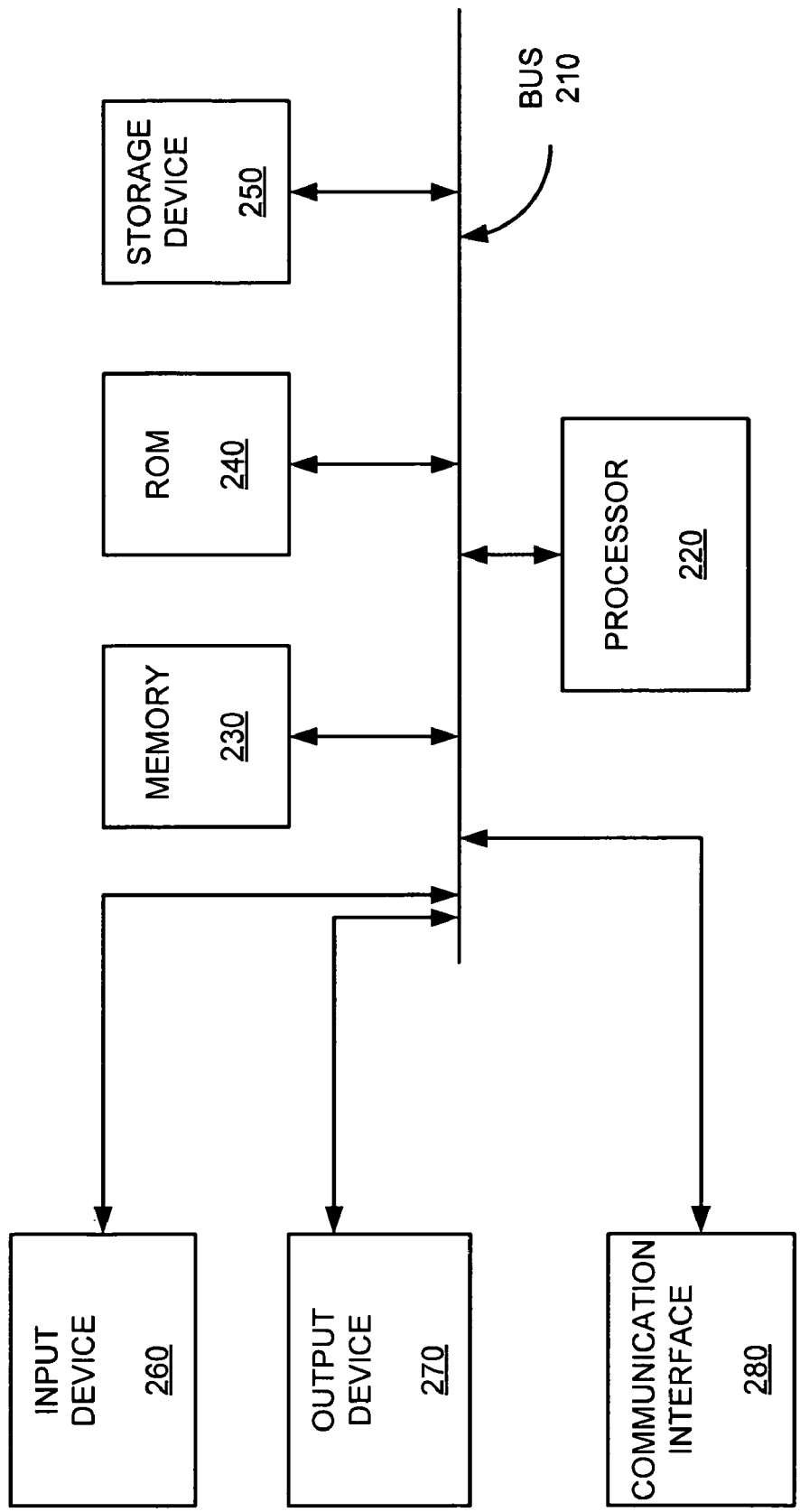
FIG. 2 is an exemplary block diagram of the server or interpreter device of FIG. 1.

FIG. 2 illustrates an exemplary configuration of each of server 140 and interpreter device 160 in an implementation consistent with the invention. Other configurations may alternatively be used. Server 140/interpreter device 160 may include a bus 210, a processor 220, a memory 230, a read only memory (ROM) 240, a storage device 250, an input device 260, an output device 270, and a communication interface 280. Bus 210 permits communication among the components of server 140/interpreter device 160.

Processor 220 may include any type of processor or microprocessor that interprets and executes instructions. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions.

Input device 260 may include one or more mechanisms that permit an interpreter to input information to server 140/interpreter device 160, such as a keyboard, a mouse, a pen, voice recognition, and/or biometric mechanisms, etc. Output device 270 may include one or more mechanisms that output information to the interpreter, including a display, a printer, one or more speakers, etc. Communication interface 280 may include any transceiver-like mechanism that enables server 140/interpreter device 160 to communicate with other devices and/or systems. For example, communication interface 280 may include a modem or an Ethernet interface to a LAN. Alternatively, communication interface 280 may include other mechanisms for communicating via a network.

Server 140, consistent with the present invention, provides a platform through which a first party using telephone device 110A may establish communications with interpreter device 160. Interpreter device 160, consistent with the present invention, provides interpretation services for a telephone call between two parties. According to an exemplary implementation, server 140/interpreter device 160 may perform various processes in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices or carrier waves. Execution of the sequences of instructions contained in memory 230 may cause processor 220 to perform acts that will be described hereafter. In alternative embodiments, hard-wired circuitry may be used in place of or in combination with software instructions to implement the present invention. Thus, the present invention is not limited to any specific combination of hardware circuitry/software.

Figure 3A:
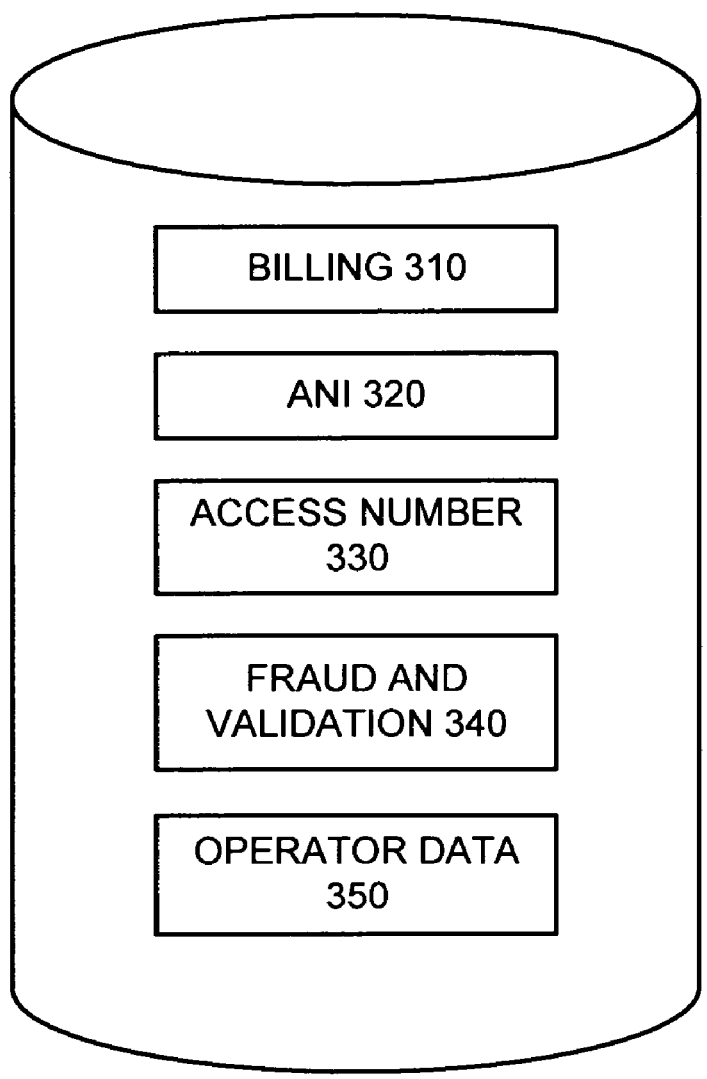
FIG. 3A is an exemplary diagram of databases that may be associated with the server of FIG. 1.

FIG. 3A illustrates an exemplary group of databases 300 that may be associated with server 140 in an implementation consistent with the principles of the invention. In an exemplary implementation, databases 300 are stored in server 140, such as in storage device 250 (FIG. 2). Alternatively, databases 300 may be located externally from server 140. Databases 300, consistent with the invention, include a billing database 310, an automatic number identification (ANI) database 320, an access number database 330, a fraud and validation database 340, and an operator data database 350. Other databases may also be included in databases 300.

Billing database 310 may store information associated with calls made to/from a subscriber telephone line and fees assessed to (e.g., decremented) from a subscriber account. For example, billing database 310 may store service fee rates associated with fee-based services used by a user of telephone devices 110 for purposes of assessing fees to an account. Billing database 310 may store information related to the account.

Figure 3B:
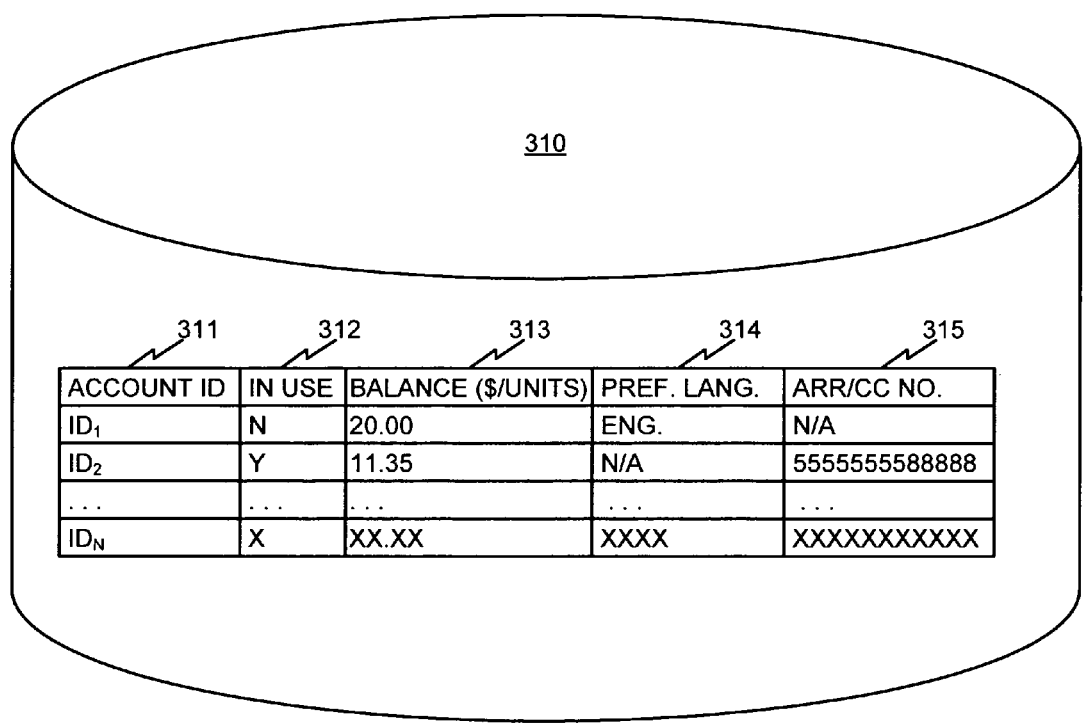
FIG. 3B is an exemplary diagram of the billing database of FIG. 3.

FIG. 3B illustrates an exemplary configuration of billing database 310 in an implementation consistent with the principles of the invention. Billing database 310, consistent with the invention, may include the following exemplary fields: an account identification field 311, an account "in use" field 312, an available balance field 313, a preferred language field 314, and an auto-recurring recharge (ARR) billing information field 315. Other fields may also be included in billing database 310.

Identification field 311 may include an account number, an associated personal identification number (PIN), subscriber information, security passwords, and the like, associated with registered accounts, that may be used to verify and/or manage an account. Account in use field 312 may include an indication of current or past use of an account, date and time logs, and the like, that may be used to track and/or restrict usage of the account. Available balance field 313 may include account balance information for the subscriber identified in identification field 311. As will be described in greater detail below, a subscriber's account balance may be decremented and/or recharged. Preferred language field 314 may include a designated preferred language that serves as a default language for communicating instructions, greetings, and the like to the user. For example, call distributor 150 may use the stored information to identify an appropriate interpreter device 160 to (initially) handle calls from telephone devices 110. ARR billing information field 315 may include subscriber billing information, such as a credit card account, for performing ARR, as described in detail below.

Returning to FIG. 3A, ANI database 320 may store a subscriber name and other information corresponding to a telephone account associated with an origination (e.g., telephone devices 110) of a request for interpretation services. For example, ANI database 320 may store a telephone number associated with telephone devices 110, an individual responsible for the account, and other subscriber information. Such information may facilitate assigning interpreter device 160 to service a call from telephone devices 110. For example, server 140 may identify a telephone number associated with a call from telephone devices 110 using ANI. Server 140 may forward the identified call to call distributor 150, which may then access ANI database 320 to identify predetermined preferred language associated with telephone devices 110.

Access number database 330 may include information associated with access numbers, such as toll-free telephone numbers (e.g., 800, 888, 866, etc.), function-keys, such as **\*9 or other key combinations, or menu selections corresponding to interpretation options included in a group of services. For example, a group of services may be associated with a calling card (e.g., Golden Retriever, commercially available from MCI, Inc.) including interpretation services. In an exemplary implementation, access number database 330 may include language information associated with particular access numbers. For example, one access number may be associated with providing Spanish-to-English interpretation services. Another access number may be associated with providing French-to-Italian interpretation services. Server 140, call distributor 150 and/or interpreter device 160 may use the language information in database 330** in providing interpretation services for a requesting party, as described in more detail below.

Fraud and validation database 340 may store telephone numbers associated with fraudulent users. Fraud and validation database 340 may also store validation information that may be used to verify subscriber identification associated with a call placed from telephone devices 110. For example, fraud and validation database 340 may include PIN information that may be used to determine when a particular PIN is in use.

Operator data database 350 may store information associated with various interpreters, such as interpreter device 160. For example, operator data database 350 may store data associated with the number of calls each interpreter services, the duration and/or type of interpretation services provided, the language(s) associated with a particular interpreter, associated fees, and the like.

Databases 300 may be used to facilitate communications between communicating parties using different languages via communications platform 130. Databases 300 may also be used to acquire and record data to enable the service provider associated with communications platform 130 to assess a fee for the interpretation services associated with use of the interpretation platform.

Exemplary Processing

Figure 4:
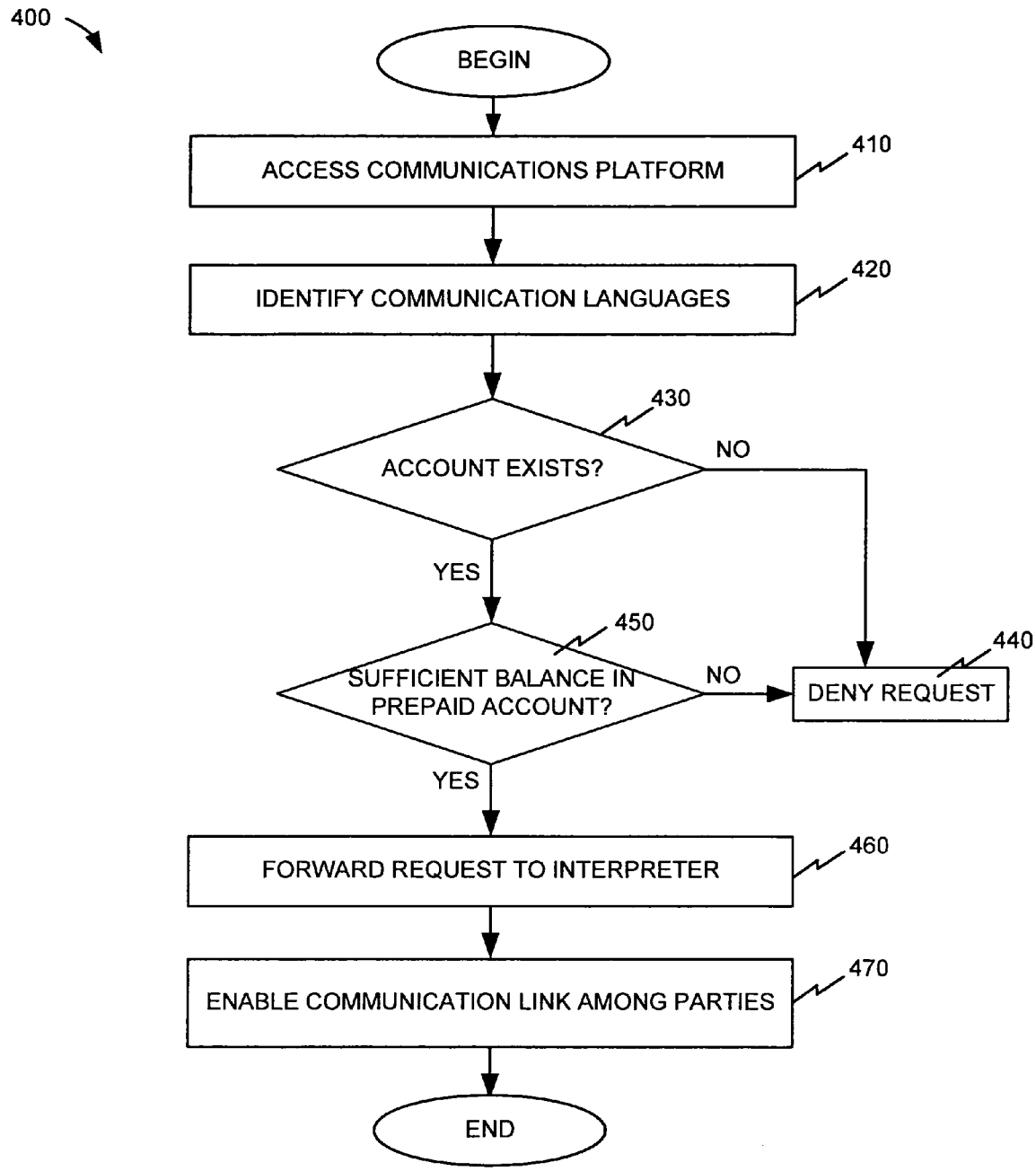
FIG. 4 is an exemplary flowchart of processing for providing interpretations services in an implementation consistent with the principles of the invention.

FIG. 4 is a flow diagram of an exemplary process 400, consistent with the invention, illustrating processing associated with enabling communications among a first party using telephone device 110A, a second party using telephone device 110B, and an interpreter using interpreter device 160.

Processing may begin with telephone device 110A connecting to communications platform 130 (act 410). The connection to communications platform 130 may be accomplished by any suitable method. The connection may be made before, during, or after establishing a communication link between telephone device 110A and telephone device 110B.

Once connected, a language interpretation request may be made by either party ("the requester") using telephone devices 110. In one implementation, the requester may make the language interpretation request by selecting a predefined function key(s) using telephone devices 110. After receiving the request, communications platform 130 may prompt the first party, the second party, or both to identify a specific language to be interpreted. The prompt may include an options menu with an associated input for selection, for example, using an IVR unit, a telephone keypad, and the like. The prompt may be communicated in any number of languages. A response identifying either or both languages may be received by communications platform 130 (act 420). In one implementation, a preferred language for the requester may be associated with the origination of the request, for example, using ANI. Corresponding subscriber information may be accessed from, for example, billing database 310.

In another implementation, the requester may place a call to a designated access number associated with, for example, a calling card. The designated access number may be specifically associated with interpretation services. Alternatively, the interpretation services may be an optional feature that is associated with a group of communication services, from which the interpretation services may be selected by the requester, for example, using an IVR unit, and the like. The designated access number may be associated with the first language, the second language, or both.

For example, a particular access number may be associated with providing Spanish-to-English interpretation services. In this case, the requester may call the particular access number associated with the particular interpretation service, if Spanish-to-English interpretation services are desired. Alternatively, the access number may be a general access number associated with a set of interpretation services, in which case the languages may be identified by the parties. In one implementation, communications platform 130 may perform an ANI on telephone devices 110 to identify the originating telephone number. Communications platform 130 may then identify Spanish-to-English services as the preferred interpretation service specific to the requester.

In another implementation, a PIN associated with a calling card may have an associated preferred interpretation service specific to the PIN. Communications platform 130 may, for example, identify Spanish-to-English services as the preferred interpretation service specific to the PIN. In each case, communications platform 130 may confirm with the caller that the caller desires to use Spanish-to-English interpretation services. If not, communications platform 130 may prompt the requester to select a particular language for interpretation. In yet a further implementation, a request for interpretation services may be made via a call to the general access number, and communications platform 130 may prompt the caller (e.g., via IVR unit in one or more languages) to select a particular language for interpretation.

For systems in which the access number is associated with the first language, greetings, promotions, information, instructions, requests for account information, prompts, etc., may be communicated in the first language. For systems in which the designated access number is associated with interpretation of the second language there may be no need for the requester to identify the second language.

Communications platform 130 may verify whether an account (e.g., a calling card) is associated with the requester to determine whether to provide the requested interpretation services using billing database 310 (FIG. 3B) (act 430). In one implementation, communications platform 130 may, for example, identify a telephone number associated with the requester and use that telephone number-as part of a look-up operation to determine if the requester is associated with an account. If, the requester is determined not to be associated with an account, communications platform 130 may deny the request (act 440). Alternatively, communications platform 130 may request that an account be established. An estimated fee for the requested interpretation services may be calculated for the type/duration of requested interpretation services. Rates for the interpretation services may be determined based on the particular language(s) being interpreted. Rates may also be affected by other aspects of the call, e.g., long distance, payphone, and the like.

Where, on the other hand, the requester is determined to be associated with an account is verified, communications platform 130 may determine whether the existing balance is sufficient for the requested interpretation services (act 450). Where the existing balance is determined to be insufficient, the language interpretation request may be denied (act 440). In this case, the requester may be notified and given the option to increase (recharge) the funds of the account according to any customary technique.

For systems in which the request is made using a designated access number, fees for the interpretation services may be assessed to the account associated with the requester. For example, the requester may be prompted to input the account information, a personal identification number (PIN), etc. Communications platform 130 may verify the account in determining whether to provide the requested services.

The fees for the interpretation services may be assessed to the account in any suitable manner based on the specific type and number of languages interpreted, the duration of the interpretation, the time of day, etc. For example, the account may be decremented using any suitable technique. If the funds of the account are depleted to any predetermined "low balance" amount during the call, the requester may be notified of the low balance and given the option to increase the funds in the account (e.g., recharge the card) according to any customary technique. Once sufficiently funded, the call may proceed.

In addition to the account information, the call to a designated access number may include identification of the destination telephone number (e.g., associated with telephone device 110B). Establishing the communication link to the destination phone number as described in detail below, may be accomplished before, during, or after the connection to communication platform 130 is established. For example, the interpretation services may be provided during all or any part of a communication between the first and second parties.

Once the first and second languages and an account are identified and sufficient funds are determined to exist in the account, the request may be forwarded to interpreter device 160 based on the identified language information (act 460).

A multi-party communication link may be enabled among telephone devices 110A, telephone devices 110B, and interpreter device 160 (act 470), for example, using three-way calling or any suitable communication link. Interpreter device 160 may use customary interpretation techniques to interpret the languages used by parties.

As noted above, interpreter device 160 may use any combination of live and automated operations in performing the interpretation. In one implementation, a speech recognition system is used to convert audible communications to text data. Interpreter device 160 may then interpret the text. Alternatively, the text may be automatically translated into the requested language. Interpreter device 160 may then read the translation. Alternatively, the translated text may be automatically converted to sound by a TTS unit. Accordingly, all or any part of the interpretation may be accomplished by automated, manual, or a combination of automated and manual operations according to various implementations consistent with the principles of the invention.

In another implementation, the interpreter associated with interpreter device 160 may translate text and/or read a translation of the communication. For instance, in circumstances in which the communication may be inaudible to the interpreter, the conversation may be converted to text and displayed to the interpreter using a speech recognizer. In one implementation, the communication may be recorded and stored as an audible file and/or a text file and provided to the parties.

In another implementation, the interpretation services may be discontinued and/or subsequently resumed at any point during the communication. Additionally, other parties may be included or dropped from the communication at any point during the communication.

EXAMPLES

FIGS. 5A through 5F illustrate an exemplary interpretation platform call flow 500 in which various systems and methods consistent with the principles of the invention may be implemented.

Figure 5A:
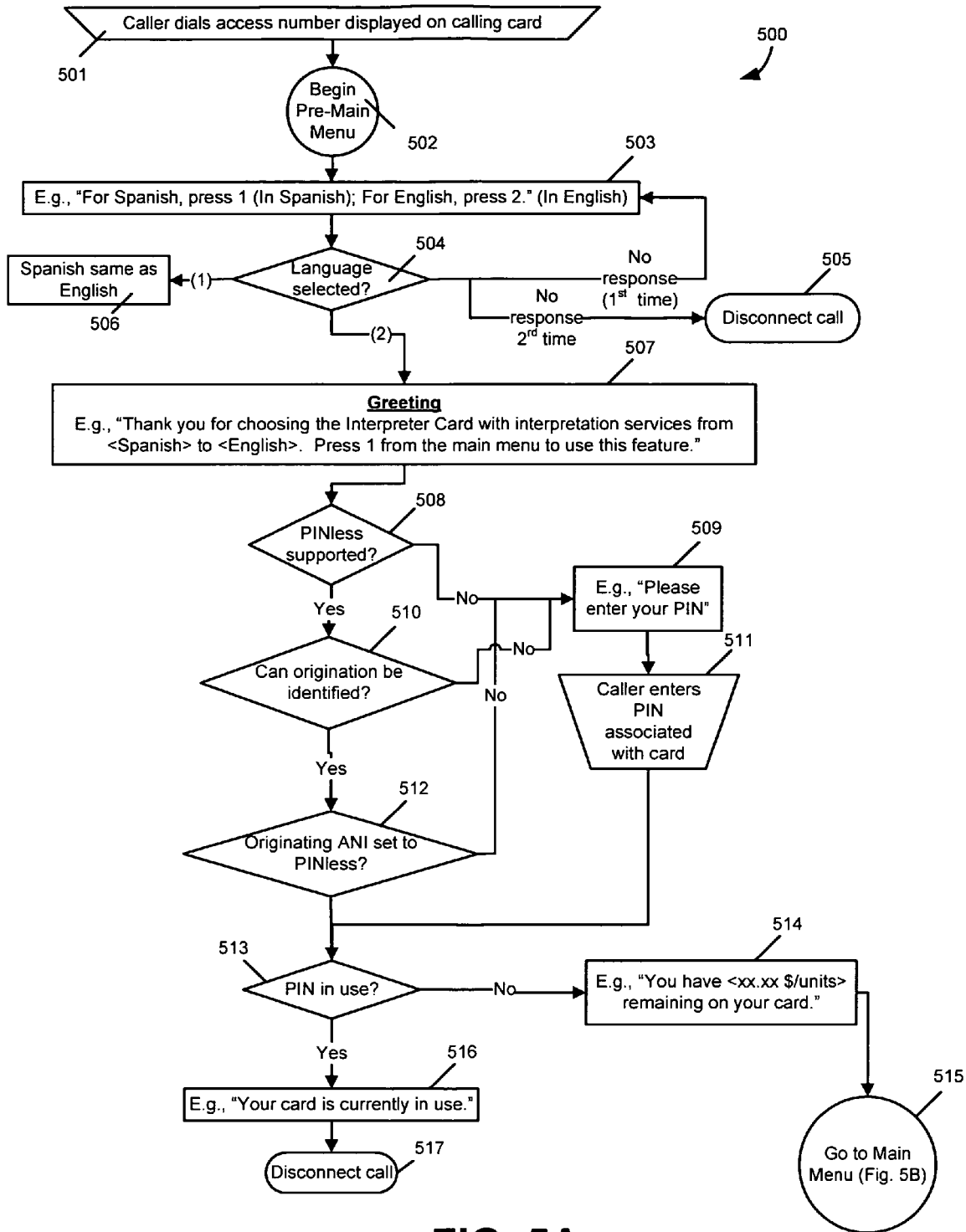
FIGS. 5A through 5F are flowcharts of an exemplary communications platform call flow consistent with the principles of the present invention.

As shown in FIG. 5A, a user of telephone device 110A may connect to communications platform 130 via network 120 for requesting interpretation services. In this example, assume that the user/requester places a call to an access number associated with an interpretation services-focused calling card associated with a prepaid account (act 501). Once connected, communications platform 130 may provide a "pre-main menu" to the user, for example, via IVR operations (act 502). For example, the pre-main menu may prompt the user to choose a preferred language from alternative languages for further IVR communications (act 503). Communications platform 130 may receive a response input by the user via any suitable technique, e.g., voice, function key input etc. (act 504).

Communications platform 130 may repeat the prompt, as necessary, for an improper response or in the absence of a response and, ultimately, disconnecting the call, if appropriate (act 505). In this example, two languages options are available, so the user may not have to identify the second language for interpreting. In another implementation, many languages may be available, so communications platform 130 may prompt the user to indicate the second language.

After selecting a language, communications platform may communicate a predetermined greeting and/or message to the user in the selected language (act 507). The operations described may be substantially identical where an alternative language is selected (act 506). Communications platform 130 may determine whether a "PIN-less" functionality is supported by the calling card (act 508). If PIN-less functionality is supported, exemplary call flow 500 may include determining whether call origination can be determined (e.g., via performing ANI) (act 510). If call origination can be determined, communications platform 130 may determine whether the originating number is set to PIN-less (act 512). Where PIN-less functionality is either not supported or not set for the originating ANI, communications platform 130 may prompt the user to enter the PIN by any suitable technique, e.g., IVR (act 509). Communications platform 130 may receive an input of the PIN by any suitable technique, e.g., voice, function key input, etc.

Once the PIN is identified, either automatically of via the user's input, communications platform 130 (e.g., using fraud and validation 340) may determine if the PIN is already in use (act 513). If the PIN is in use, communications platform 130 may communicate a message to that effect to the user (act 516), and disconnect the call, for example (act 517). If the PIN is not in use, communications platform 130 may determine the available balance of the prepaid account, and communicate the balance to the user (act 514). Communications platform 130 may communicate a "main menu" to the user, for example, via IVR operations (acts 515 and 518).

Figure 5B:
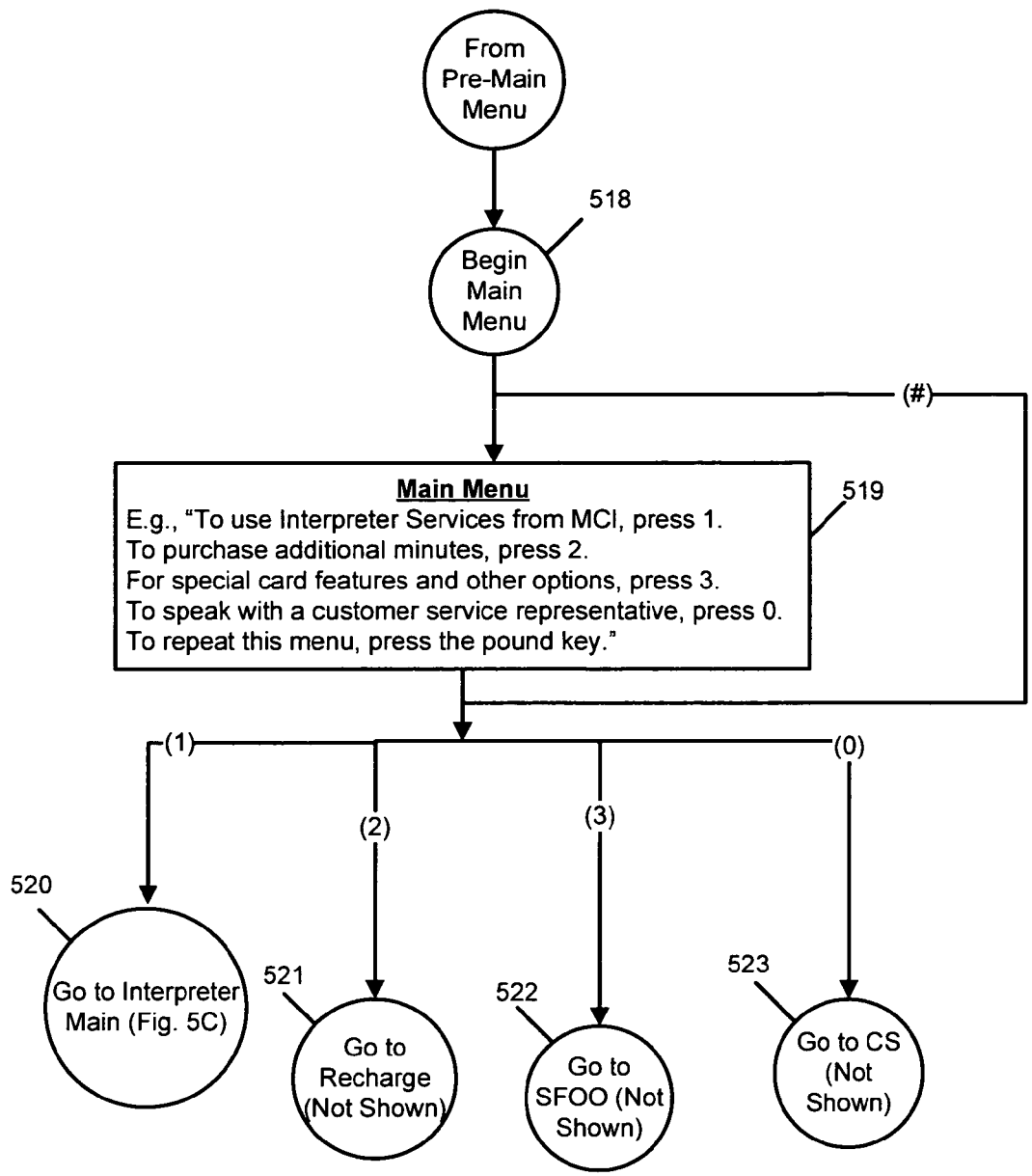

As shown in FIG. 5B, communications platform 130 may communicate the main menu including any number of various options to the user by any suitable technique, e.g., IVR (act 519). In addition to interpretation services (act 520), the user may select to add funds to the balance of the prepaid account (act 521), access special card features and other options (SFOO) (act 522), speak with a customer service (CS) representative (act 523), etc. Other options may additionally or alternatively be presented to the user.

Figure 5C:
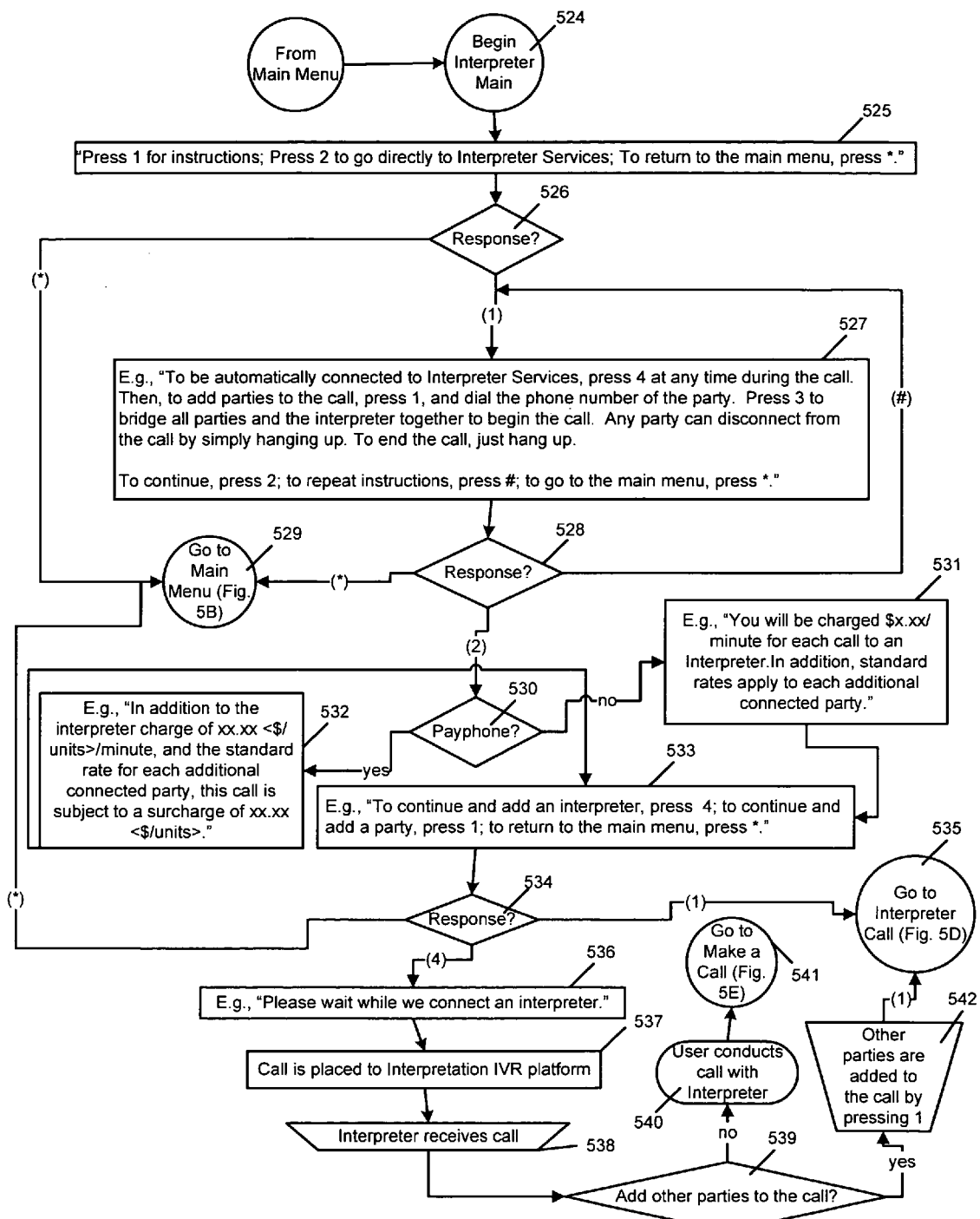

Assume the user selects interpretation services. As shown in FIG. 5C, communications platform 130 may begin interpretation services (act 524) by communicating a main menu to the user by any suitable technique (act 525). The user may provide a response by selecting any number of options by any suitable technique (act 526). For example, the user may return to the main menu (act 529), receive interpretation instructions (act 527), etc. Assume the user elects to receive the interpretation instructions. The user may provide a response to the instructions by selecting any number of options by any suitable technique (act 528).

Communications platform 130 may, for example, determine whether the request/call originated from a payphone (act 530). Where the request/call does not originate from a payphone, communications platform 130 may communicate the fees for the call to the user (act 531). Where the request/call does originate from a payphone, communications platform 130 may communicate the fees for the call, including a surcharge, to the user (act 532). In either event, communications platform 130 may communicate a menu including various options for proceeding etc. to the user (act 533). The user may provide a response selecting any number of options by any suitable technique (act 534).

Figure 5D:
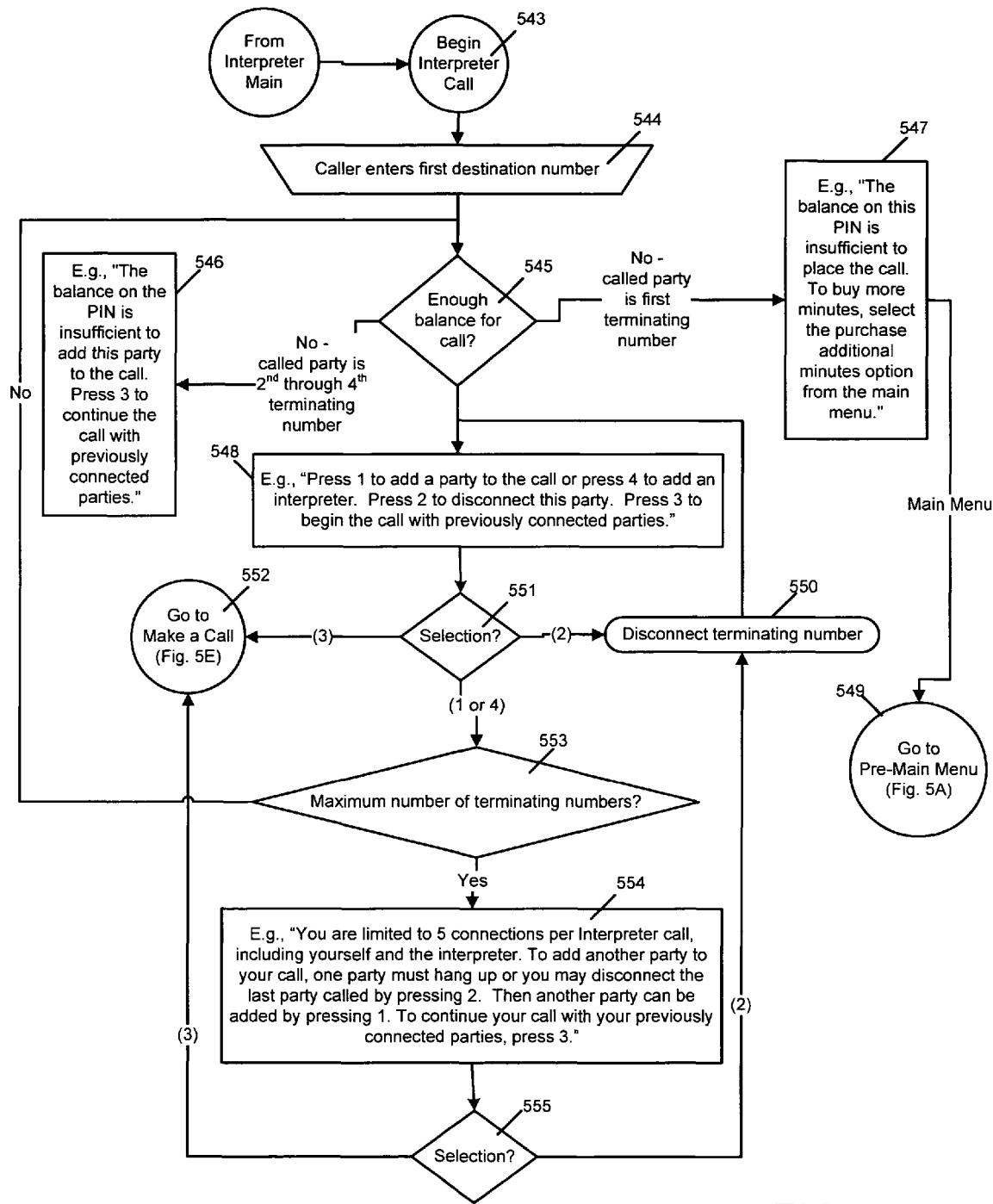
Figure 5E:
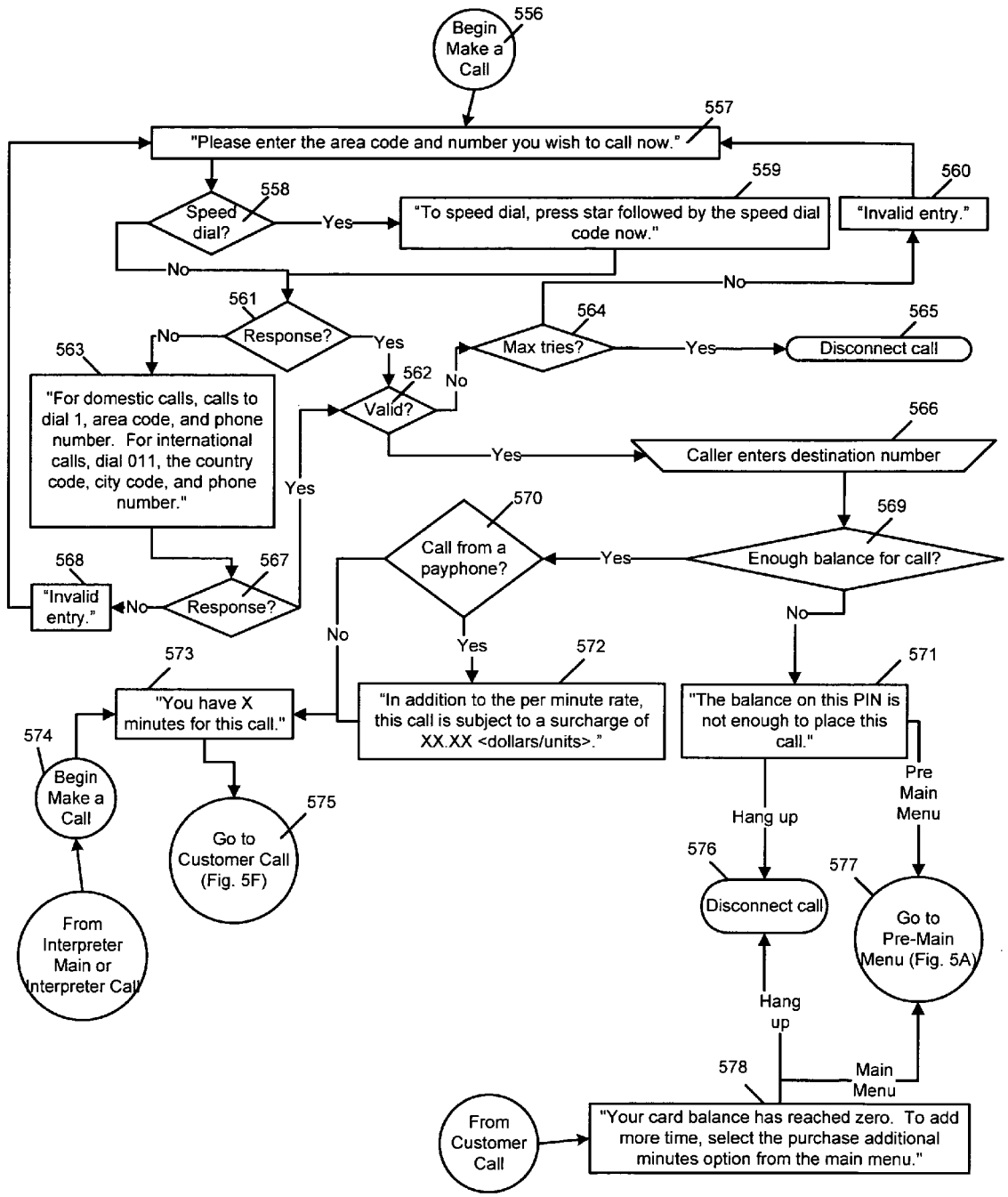
Figure 5F:
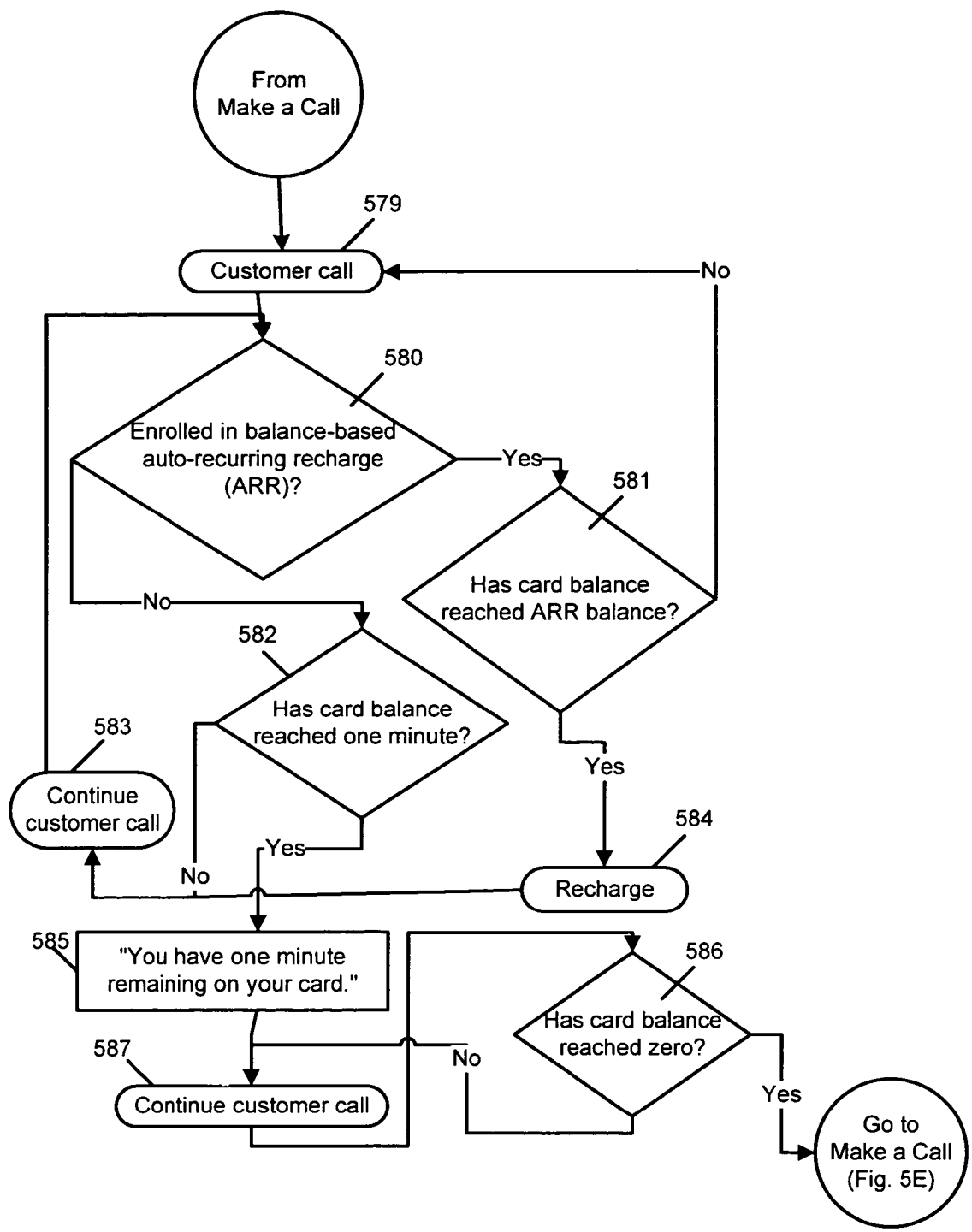

For example, the user may elect to connect to an interpreter, and communications platform 130 may communicate an appropriate message to the user (act 536). Communications platform 130 may forward the call to an interpretation platform (act 537). The forwarded call may be distributed to an interpreter, for example, based on the languages to be interpreted (act 538). Communications platform 130 may present an option to the user to add additional parties to the call (act 539). Where no additional parties are added, the user may conduct the call with the interpreter (act 540), and call setup may begin, as illustrated in FIG. 5E (act 541). Where additional parties are added (act 542), or the user directly elects, interpreter call setup may begin, as illustrated in FIG. 5D (act 535).

Interpreter call setup may begin (act 543), for example, with the user entering a destination telephone number (act 544). Communications platform 130 may determine whether the prepaid account has a sufficient balance for assessing the fees for the call, based on, for example, the interpretation services, surcharges, long-distance rates, number of connections, etc. (act 545). Where insufficient funds are in the prepaid account and the destination number is associated with the first telephone number to be connected, communications platform 130 may inform the user of the deficiency and give the option to recharge the account (act 547), for example, by returning to the main menu (act 549). Alternatively, where insufficient funds exist for connecting additional parties, communications platform 130 may inform the user of the deficiency and give the option to proceed with the call with the currently connected parties (act 546). Other options may be additionally or alternatively presented to the user.

Where sufficient funds are in the prepaid account to place the call, communications platform 130 may communicate instructions for proceeding with the call to the user using any suitable technique (act 548). The user may provide a response by selecting any number of options by any suitable technique (act 551). For example, the call may be initiated with previously connected parties (act 552). Alternatively, a party may be disconnected from the call (act 550). Another alternative is to add an interpreter or additional parties to the call, in which case, communications platform 130 may determine whether a predetermined maximum number of parties to the call would be exceeded by the additional parties/interpreter (act 553). Other options may be presented to the user. Where the predetermined maximum number of parties is not exceeded (or no limit exists), communications platform 130 may recalculate the fees associated with the call, including the additional parties, and compare the recalculated fees to the balance available in the prepaid account (act 545).

Where the predetermined maximum number of parties is exceeded, communications platform 130 may inform the user to that effect and present various options for proceeding to the user (act 554). The user may provide a response by selecting any number of options by any suitable technique (act 555). For example, the user may elect to disconnect one or more parties to the call (act 550). Alternatively, the user may elect to proceed with the call including the currently connected parties (act 552). Other options may be additionally or alternatively presented to the user.

As illustrated in FIG. 5E, call initiation setup may begin (act 556), for example, with a prompt to the user to enter an area code and number for the destination party (act 557). Communications platform 130 may determine whether speed-dial functionality is supported (act 558). Where speed-dial functionality is supported, communications platform 130 may present the user with the option to use speed-dial to enter the destination number and prompted/instructed how to do so (act 559). Whether or not speed-dial functionality is supported, communications platform 130 may receive a user response from the user (act 561).

Where no response is received, communications platform 130 may prompt/instruct the user to manually input a destination telephone number (act 563). Communications platform 130 may receive the manually input number (act 567). Where no input is received, communications platform 130 may communicate "invalid entry" or a similar message to the user (act 568), and prompt the user to re-enter a number (act 557).

Where an input is received from either speed-dialing (act 561) or manual dialing (act 567), communications platform 130 may determine whether the input is valid (act 562). Where it is determined that the number received is invalid, communications platform 130 may determine whether a predetermined maximum number of dialing attempts has been exceeded (act 564). Where the predetermined maximum number of dialing attempts has been exceeded, communications platform 130 may disconnect the call (act 565). Where the predetermined maximum number of dialing attempts has not exceeded, communications platform 130 may communicate "invalid entry" or a similar message to the user (act 560), and prompt the user to re-enter a number (act 557).

Where it is determined that the number is valid, communications platform 130 may receive the entered number from the user (act 566). Communications platform 130 may determine if the prepaid account balance is sufficient for the call (act 569). Where it is determined that the balance is insufficient, communications platform 130 may inform the user of the low balance (act 571). At which point, the user may hang up, disconnecting the call (act 576), or be redirected to pre-main menu (act 577).

Where it is determined that the balance is sufficient, communications platform 130 may determine whether the call originates from a payphone (act 570). Where the call originates from a payphone, communications platform 130 may inform the user of an applicable surcharge. Where either the call does not originate from a payphone or the user has been informed of the surcharge, communications platform 130 may calculate the number of minutes available from the prepaid account for the call and inform the user of the available minutes (act 573). Communications platform 130 may place the call (act 575).

Communications platform 130 may enable the user's call (act 579). Communications platform 130 may determine whether the prepaid account has an associated balanced-based, auto-recurring recharge (ARR) feature (act 580). Where the prepaid account has an associated ARR feature, communications platform 130 may determine whether a predetermined (low) balance has been attained (act 581). Where the low balance has not been attained, communications platform 130 may proceed with the call (act 579). Where the low balance has been attained, communications platform 130 may automatically recharge the balance to a predetermined amount (act 584) without disruption of the call (act 583).

Where the prepaid account does not have an associated ARR feature, communications platform 130 may determine whether the prepaid account has attained a predetermined pre-zero low balance (act 582). Where the pre-zero low balance has not been attained, communications platform 130 may proceed with the call (act 583). Where the pre-zero low balance has been attained, communications platform 130 may inform the user of the low balance (act 585), and proceed with the call (act 587). Communications platform 130 may determine whether the prepaid account balance has been depleted (act 586). Where the balance has not been depleted, communications platform 130 may proceed with the call (act 587). Where the balance has been depleted, communications platform 130 may inform the user of same (act 578) and present the user with the option of disconnecting the call (act 576) or purchasing more time from the main menu (act 577).

CONCLUSION

Systems and methods described herein enable multi-party, multi-language communications by providing interpretation of two or more languages. The communications may include a conference call involving any number of links/parties.

In this disclosure, there is shown and described preferred embodiments of the invention, but, as aforementioned, it is to be understood that the invention is capable of use in various other combinations and environments and is capable of changes or modifications within the scope of the inventive concept as expressed herein.

In the series of acts described with respect to FIGS. 4 and 5A-5F, the order of the operations may be varied in other implementations consistent with the present invention. Moreover, non-dependent acts may be performed in parallel.

No element, operation, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method of providing communication services, performed by one or more server devices, the method comprising:

receiving, using a communication interface associated with the one or more server devices, a language interpretation request from a first party via a telephone device;

prompting, using a processor associated with the one or more server devices, the first party to select a first language by providing an options menu;

receiving, using a communication interface associated with the one or more server devices, a response identifying the first language from the first party;

prompting, using a processor associated with the one or more server devices, the first party to select a second language by providing the options menu, where the second language is different from the first language;

receiving, using a communication interface associated with the one or more server devices, a response identifying the second language from the first party;

determining, using a processor associated with the one or more server devices, whether the first party is associated with an account, to which a fee associated with the language interpretation is to be debited; and providing, using a processor associated with the one or more server devices, a language interpretation between the first language and the second language based on the association of the first party with the account.

2. The method of claim 1, where the receiving the language interpretation request occurs in response to a selection of a function key during communications between the first party and a second party.

3. The method of claim 1, where the receiving the language interpretation request comprises:

receiving, from the first party, a call placed to a designated access number.

4. The method of claim 1, further comprising:

establishing a communication link between the first party and an interpreter before establishing a communication link to a second party.

5. The method of claim 1, further comprising:

enabling a multi-party communication among the first party, a second party, and an interpreter based on the association of the first party with the prepaid account and the identification of the first language and the second language.

6. The method of claim 1, where the determining whether the first party is associated with the prepaid account comprises:
identifying a calling card associated with interpretation services.

7. The method of claim 1, where the determining whether the first party is associated with the prepaid account comprises:
identifying a calling card associated with a group of communication services including interpretation services.

8. The method of claim 7, further comprising:
determining the fee associated with the interpretation services; and
decrementing the account based on the fee.

9. The method of claim 1, where the determining whether the first party is associated with the prepaid account comprises:
performing an automatic number identification (ANI) associated with an origination of the language interpretation request; and
using the ANI to determine the association of the first party with the account.

10. The method of claim 1, further comprising:
interpreting communications between the first party and a second party.

11. The method of claim 10, where the interpreting the communications comprises:
converting voice data to text data; and
translating the text data between the first language and the second language.

12. A system comprising:
a memory to store instructions; and
a processor to execute the instructions to:
receive a language interpretation request from a first party to request language interpretation service between the first party and a second party;
determine whether the first party is associated with an account;
determine, when the first party is determined to be associated with an account, whether sufficient funds are in the account for the language interpretation service; and
enable a multi-party communication among the first party, the second party, and an interpreter device, when the account has the sufficient funds, where the interpreter device provides the language interpretation service.

13. The system of claim 12, where the processor is further to:
receive the language interpretation request based on a function key selected by the first party during a communication between the first and second parties.

14. The system of claim 12, where the processor is further to:
prompt at least one of the first party or the second party to identify a first language, a second language, or both the first and second languages.

15. The system of claim 14, where the processor is further to:
receive an input in response to the prompt; and
selectively route the language interpretation request to the interpreter device based on the response.

16. The system of claim 12, where the processor is further to:
receive the language interpretation request based on a call placed to a designated access number.

17. The system of claim 16, where the processor is further to:
identify at least one of a first language or a second language based on the designated access number.

18. The system of claim 16, where the designated access number is associated with a calling card that is associated with language interpretation services.

19. The system of claim 16, where the designated access number is associated with a calling card that is associated with a group of communication services including language interpretation services.

20. The system of claim 12, where the processor is further to:
perform an automatic number identification (ANI) associated with a source of the language interpretation request; and
identify at least one of a first language or a second language based on the ANI.

21. The system of claim 20, where the processor is further to:
verify the account based on the ANI.

22. The system of claim 12, where the processor is further to:
determine a fee associated with the language interpretation service; and
deduct the fee from the account.

23. The system of claim 22, where the fee includes charges associated with at least one of a long-distance telephone service, a payphone surcharge, or a multi-way call.

24. The system of claim 12, where the processor is further to:
convert at least some of the multi-party communication to text data; and
translate the text data between a first language and a second language.

25. An interpretation platform comprising:
means for receiving a request for interpretation services from a first party;
means for prompting the first party to select a first language by providing an options menu;
means for receiving a response identifying the first language from the first party;
means for prompting the first party to select a second language by providing the options menu, where the second language is different from the first language;
means for receiving a response identifying the second language from the first party;
means for verifying an account to which a fee, associated with the interpretation services, is to be debited; and
means for providing interpretation services, between the first language and the second language, via a multi-party communication link based on the verification.

26. A method comprising:
connecting a device associated with a calling party to a multi-party communication link;
receiving a request for interpretation services between the calling party and a called party based on an input from the device associated with the calling party, the input including at least one of a function key selection, a call placed to an access number, or a response to a prompt from an interactive voice response (IVR) unit;
identifying, by accessing one or more databases, a first language associated with the calling party and a second language, different from the first language, associated with the called party, the identifying being based on at least one of an origination associated with the request, the access number, or a response to a further prompt from the IVR unit;

forwarding the request to an interpreter device based on the identified first and second languages;

connecting the interpreter device to the multi-party communication link;

connecting a device associated with the called party to the multi-party communication link;

determining, by accessing a database, a fee associated with the interpretation services; and assessing the fee to a subscriber account associated with the calling party.

* * * * *